United States Patent
Li et al.

(10) Patent No.: US 9,980,283 B2
(45) Date of Patent: May 22, 2018

(54) RADIO COMMUNICATION METHOD, NETWORK SIDE DEVICE AND USER EQUIPMENT

(71) Applicant: Huawei Technologies Co., Ltd., Shenzhen (CN)

(72) Inventors: Chaojun Li, Shenzhen (CN); Sha Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 209 days.

(21) Appl. No.: 14/800,463

(22) Filed: Jul. 15, 2015

(65) Prior Publication Data

US 2015/0319779 A1 Nov. 5, 2015

Related U.S. Application Data

(63) Continuation of application No. PCT/CN2013/070480, filed on Jan. 15, 2013.

(51) Int. Cl.
| | |
|---|---|
| *H04W 74/00* | (2009.01) |
| *H04L 5/00* | (2006.01) |
| *H04L 27/26* | (2006.01) |
| *H04W 74/08* | (2009.01) |

(52) U.S. Cl.
CPC ......... *H04W 74/002* (2013.01); *H04L 5/0007* (2013.01); *H04L 27/2613* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2010/0098189 A1* | 4/2010 | Oketani | H04J 13/14 375/295 |
| 2010/0165942 A1 | 7/2010 | Liao et al. | |
| 2010/0220664 A1* | 9/2010 | Hooli | H04L 7/041 370/329 |
| 2010/0226324 A1* | 9/2010 | Lee | H04W 48/08 370/329 |
| 2010/0296451 A1 | 11/2010 | Li et al. | |
| 2011/0039499 A1 | 2/2011 | Zhang et al. | |
| 2011/0105135 A1* | 5/2011 | Krishnamurthy | H04W 16/10 455/450 |

(Continued)

FOREIGN PATENT DOCUMENTS

| | | |
|---|---|---|
| CN | 101415232 A | 4/2009 |
| CN | 101904206 A | 12/2010 |

(Continued)

*Primary Examiner* — Kodzovi Acolatse
(74) *Attorney, Agent, or Firm* — Leydig, Voit & Mayer, Ltd.

(57) ABSTRACT

The present disclosure provides a radio communication method, a user equipment, and a network side device, the radio communication method includes: receiving, by a network side device, a random access preamble signal transmitted by a user equipment, where duration of the random access preamble signal is one SC-FDMA symbol or one OFDM symbol, thus air interface overhead of random access can be greatly reduced in a condition that a user equipment can access a cell randomly. The cell may be a microcell or other similar cells.

14 Claims, 4 Drawing Sheets

(56) References Cited

U.S. PATENT DOCUMENTS

| | | | |
|---|---|---|---|
| 2011/0305180 A1* | 12/2011 | Osterling | H04W 74/006 370/311 |
| 2012/0033625 A1* | 2/2012 | Nagata | H04L 5/0023 370/329 |
| 2012/0113942 A1* | 5/2012 | Kim | H04L 1/1861 370/329 |
| 2013/0083759 A1* | 4/2013 | Rong | H04W 48/20 370/329 |
| 2013/0287001 A1* | 10/2013 | Sahlin | H04W 72/0426 370/330 |
| 2014/0064206 A1* | 3/2014 | Bao | H04W 72/1278 370/329 |
| 2014/0086161 A1* | 3/2014 | Cai | H04W 72/042 370/329 |

FOREIGN PATENT DOCUMENTS

| | | | | |
|---|---|---|---|---|
| CN | 102474884 A | | 5/2012 | |
| CN | 102595635 A | | 7/2012 | |
| WO | WO/2012/130071 | * | 10/2012 | H04W 72/12 |
| WO | WO 2013116762 A1 | | 8/2013 | |

* cited by examiner

_(54) RADIO COMMUNICATION METHOD, NETWORK SIDE DEVICE AND USER EQUIPMENT_

CROSS REFERENCE TO RELATED APPLICATIONS

This application is a continuation of International Patent Application No. PCT/CN2013/070480, filed on Jan. 15, 2013, which is hereby incorporated by reference in its entirety.

TECHNICAL FIELD

The present disclosure relates to the field of communications technologies and, in particular, to a radio communication method, a network side device and a user equipment.

BACKGROUND

With popularization of smart phones and rapid development of mobile internet technologies, a problem of network capacity and base station deployment is becoming more and more serious. Capacity expansion based on a macro station may render site selection of a base station and engineering construction more and more difficult, and may lead to higher and higher costs, and therefore, miniaturization, low power consumption, controllability and intelligentization of a base station device have already become a mainstream trend. Hereto, a series of miniaturized base stations, namely small base stations, including a femtocell (Femtocell), a picocell (Picocell) and a microcell (Microcell) and so on, has been launched on the industry chain simultaneously, and all these technologies can be called small cell (Small Cell) technology. A Small Cell is a wireless access point with low power, which may cover a range of 10 meters to 200 meters, and being compared with a macro station, a characteristic of the Small Cell is that it may improve indoor coverage depth, increase network capacity and lift user experience etc. In deployment of a long term evolution (Long Term Evolution, LTE for short) system, in order to support more users and higher system capacity, many small base stations may be deployed within the coverage of a macro cell. At present, the LTE system is designed aiming at macro cells, and channels and signals in the system should satisfy the macro coverage. But for the Small Cell, how to provide higher bandwidth, better performance and lower costs according to its characteristics is a problem that needs to be considered urgently.

Any cellular system has a basic requirement that a terminal needs to have a possibility of applying for establishing a network connection, which is usually referred to as random access. One step in a random access process is that a user equipment (User Equipment, UE for short) transmits a random access preamble (preamble) signal, and a base station performs timing estimation based on this signal, thereby realizing uplink synchronization. Duration of the preamble signal relates to a coverage range of a cell, and the bigger the coverage range is, the longer the duration of the preamble signal gets. In the present LTE system, preamble signals are all relatively long, where preamble format 0 lasts for about 1 millisecond (ms), supporting coverage up to 14 kilometers, preamble format 1 lasts for about 2 ms, supporting coverage up to 77 kilometers, preamble format 2 lasts for about 2 ms, supporting coverage up to 29 kilometers, and preamble format 3 lasts for about 3 ms, supporting coverage up to 100 kilometers. But for a Small Cell, preamble signals of these formats are all relatively long, which is a waste of resources.

SUMMARY

The present disclosure provides a radio communication method, a network side device and a user equipment, so as to reduce air interface overhead of random access on a premise that a user equipment in a small cell can access the small cell randomly.

A first aspect of the present disclosure provides a radio communication method, including:

receiving, by a network side device, a random access preamble signal transmitted by a user equipment, where duration of the random access preamble signal is one single carrier frequency division multiple access SC-FDMA symbol or one orthogonal frequency division multiplexing OFDM symbol;

generating, by the network side device, a random access response and transmitting the random access response to the user equipment.

In a first possible implementation mode of the first aspect, according to the first aspect, before the receiving, by a network side device, a random access preamble signal transmitted by a user equipment, further including:

transmitting, by the network side device, a signaling to the user equipment, where the signaling is used to indicate that the duration of the random access preamble signal currently used by the user equipment is one SC-FDMA symbol or one OFDM symbol.

In a second possible implementation mode of the first aspect according to the first possible implementation mode of the first aspect, the network side device is a base station of a small cell, and/or, before the transmitting, by the network side device, a signaling to the user equipment, further including:

determining, by the network side device, that the user equipment does not need to execute uplink time synchronization.

In a third possible implementation mode of the first aspect according to the first aspect, the first possible implementation mode of the first aspect or the second possible implementation mode of the first aspect, before the receiving, by a network side device, a random access preamble signal transmitted by a user equipment, further including:

determining, by the network side device, a physical random access channel PRACH resource band or resource band pair used to carry the random access preamble signal of the user equipment;

transmitting, by the network side device, to the user equipment, a transmission period of the PRACH resource band or resource band pair, a transmission offset of the PRACH resource band or resource band pair in each transmission period, and a frequency domain position of the PRACH resource band or resource band pair.

In a fourth possible implementation of the first aspect according to the third possible implementation mode of the first aspect, the network side device further transmits one type of following information or an arbitrary combination thereof:

when bandwidth of the PRACH resource band or resource band pair is configurable, frequency domain bandwidth of the PRACH resource band or resource band pair;

when the PRACH resource band or resource band pair supports frequency hopping, frequency hopping information of the PRACH resource band or resource band pair, where the frequency hopping information includes any one of or a combination of: information about whether the frequency hopping is performed on the PRACH resource band or resource band pair, and frequency hopping bandwidth of the PRACH resource band or resource band pair.

In a fifth possible implementation mode of the first aspect according to the third or the fourth possible implementation mode of the first aspect, before the receiving, by a network side device, a random access preamble signal transmitted by a user equipment, further including:

transmitting, by the network side device, a signaling to the user equipment, where the signaling is used to indicate a cyclic shift interval between two adjacent random access preamble signals which are borne on the PRACH resource band or resource band pair.

In a sixth possible implementation mode of the first aspect according to any one of the third to the fifth possible implementation modes of the first aspect, the network side device determines that the PRACH resource band or resource band pair is not used to carry a physical uplink shared channel.

In a seventh possible implementation mode of the first aspect according to the first aspect or any one of the first to the sixth possible implementation modes of the first aspect, before the receiving, by a network side device, a random access preamble signal transmitted by a user equipment, further including:

when determining, by the network side device, that a length of a preamble sequence of the random access preamble signal is 12 or 24, taking a sequence, which is based on quaternary phase shift keying and searched by a computer, as the preamble sequence of the random access preamble signal; when determining that the length of the preamble sequence of the random access preamble signal is greater than or equal to 36, and smaller than or equal to 72, taking a Zadoff-Chu sequence as the preamble sequence of the random access preamble signal.

In a eighth possible implementation mode of the first aspect according to the first aspect or any one of the first to the seventh possible implementation modes of the first aspect, before the receiving, by a network side device, a random access preamble signal transmitted by a user equipment, further including:

determining, by the network side device, a sequence group number and a base sequence number of the random access preamble signal, where the determined sequence group number is consistent with a sequence group number of a sounding reference signal or a physical uplink shared channel demodulation reference signal, and the determined base sequence number is consistent with a base sequence number of the sounding reference signal or the physical uplink shared channel demodulation reference signal;

transmitting, by the network side device, the determined sequence group number and the determined base sequence number to the user equipment.

In a ninth possible implementation mode of the first aspect according to the first aspect or any one of the first to the eighth possible implementation modes of the first aspect, before the receiving, by a network side device, a random access preamble signal transmitted by a user equipment, further including:

determining, by the network side device, a symbol used to carry a PRACH resource band or resource band pair of the random access preamble signal in a subframe, where for a frequency division duplexing system, the symbol is the last one SC-FDMA symbol or OFDM symbol in an uplink subframe; or, for a time division duplexing system, the symbol is last one or last two SC-FDMA symbols or OFDM symbols in an uplink subframe or a special subframe.

In a tenth possible implementation mode of the first aspect according to the first aspect or any one of the first to the ninth possible implementation modes of the first aspect, before the receiving, by a network side device, a random access preamble signal transmitted by a user equipment, further including:

determining, by the network side device, that the random access preamble signal adopts a mapping manner with one subcarrier interval in a frequency domain;

correspondingly, before the receiving, by a network side device, a random access preamble signal transmitted by a user equipment, further including: transmitting, by the network side device, a transmission comb of the random access preamble signal to the user equipment.

In a eleventh possible implementation mode of the first aspect according to the first aspect or any one of the first to the tenth possible implementation modes of the first aspect, the random access response does not include timing alignment information.

A second aspect of the present disclosure provides a radio communication method, including:

generating, by a user equipment, a random access preamble signal, where duration of the random access preamble signal is one single carrier frequency division multiple access SC-FDMA symbol or one orthogonal frequency division multiplexing OFDM symbol;

transmitting, by the user equipment, the random access preamble signal to a network side device;

receiving, by the user equipment, a random access response transmitted by the network side device.

In a first possible implementation mode of the second aspect according to the second aspect, before the generating, by a user equipment, a random access preamble signal, further including:

receiving, by the user equipment, a signaling transmitted by the network side device, where the signaling is used to indicate that the duration of the random access preamble signal currently used by the user equipment is one SC-FDMA symbol or one OFDM symbol;

the generating, by a user equipment, a random access preamble signal includes:

generating, by the user equipment, the random access preamble signal according to the signaling.

In a second possible implementation mode of the second aspect according to the first possible implementation mode of the second aspect, the user equipment locates in a small cell;

and/or, the signaling is transmitted after the network side device determines that the user equipment does not need to execute uplink time synchronization.

In a third possible implementation mode of the second aspect according to the second aspect, the first possible implementation mode of the second aspect or the second possible implementation mode of the second aspect, before the transmitting, by the user equipment, the random access preamble signal to a network side device, further including:

receiving, by the user equipment, information about a physical random access channel PRACH resource band or resource band pair used to carry the random access preamble signal of the user equipment, where the information is transmitted by the network side device, and the information includes a transmission period of the PRACH resource band or resource band pair, a transmission offset of the PRACH resource band or resource band pair in each transmission period, and a frequency position of the PRACH resource band or resource band pair;

before the transmitting, by the user equipment, to a network side device the random access preamble signal, further including:

determining, by the user equipment, according to the information about the PRACH resource band or resource band pair, a PRACH used to carry the random access preamble signal of the user equipment.

In a fourth possible implementation mode of the second aspect according to the third possible implementation mode of the second aspect, the information about the PRACH resource band or resource band pair further includes one type of following information or a combination thereof:

when bandwidth of the PRACH resource band or resource band pair is configurable, frequency domain bandwidth of the PRACH resource band or resource band pair;

when the PRACH resource band or resource band pair supports frequency hopping, frequency hopping information of the PRACH resource band or resource band pair, where the frequency hopping information includes any one of or a combination of: information about whether the frequency hopping is performed on the PRACH resource band or resource band pair, and frequency hopping bandwidth of the PRACH resource band or resource band pair.

In a fifth possible implementation mode of the second aspect according to the third or the fourth possible implementation mode of the second aspect, before the transmitting, by the user equipment, the random access preamble signal to a network side device, further including:

receiving, by the user equipment, a signaling transmitted by the network side device, where the signaling is used to indicate a cyclic shift interval between two adjacent random access preamble signals which are borne on the PRACH resource band or resource band pair;

the generating, by a user equipment, a random access preamble signal includes:

generating, by the user equipment, the random access preamble signal according to the cyclic shift interval.

In a sixth possible implementation mode of the second aspect according to the third, the fourth or the fifth possible implementation mode of the second aspect, the user equipment does not use the PRACH resource band or resource band pair to carry a physical uplink shared channel.

In a seventh possible implementation mode of the second aspect according to the second aspect or any one of the first to the sixth possible implementation modes of the second aspect, before the transmitting, by the user equipment, the random access preamble signal to a network side device, further including:

when determining, by the user equipment, that a length of a preamble sequence of the random access preamble signal is 12 or 24, taking a sequence, which is based on quaternary phase shift keying and searched by a computer, as the preamble sequence of the random access preamble signal; when determining that the length of the preamble sequence of the random access preamble signal is greater than or equal to 36, and smaller than or equal to 72, taking a Zadoff-Chu sequence as the preamble sequence of the random access preamble signal.

In a eighth possible implementation mode of the second aspect according to the second aspect or any one of the first to the seventh possible implementation modes of the second aspect, before the transmitting, by the user equipment, the random access preamble signal to a network side device, further including:

receiving, by the user equipment, a sequence group number and a base sequence number of the random access preamble signal that are transmitted by the network side device; where the sequence group number is consistent with a sequence group number of a sounding reference signal or a physical uplink shared channel demodulation reference signal, and the base sequence number is consistent with a base sequence number of the sounding reference signal or the physical uplink shared channel demodulation reference signal;

the generating, by a user equipment, a random access preamble signal includes:

generating, by the user equipment, according to the sequence group number and the base sequence number, the random access preamble signal.

In a ninth possible implementation mode of the second aspect according to the second aspect or any one of the first to the eighth possible implementation modes of the second aspect, before the transmitting, by the user equipment, the random access preamble signal to a network side device, further including:

determining, by the user equipment, a symbol configured to carry a PRACH resource band or resource band pair of the random access preamble signal in a subframe, where for a frequency division duplexing system, the symbol is last one SC-FDMA symbol or OFDM symbol in an uplink subframe; or, for a time division duplexing system, the symbol is last one or last two SC-FDMA symbols or OFDM symbols in an uplink subframe or a special subframe.

In a tenth possible implementation mode of the second aspect according to the second aspect or any one of the first to the ninth possible implementation modes of the second aspect, before the transmitting, by the user equipment, to a network side device the random access preamble signal, further including:

determining, by the user equipment, that the random access preamble signal adopts a mapping manner with one subcarrier interval in a frequency domain; and receiving a transmission comb of the random access preamble signal transmitted by the network side device;

the transmitting, by the user equipment, the random access preamble signal to a network side device includes:

transmitting, by the user equipment, the random access preamble signal on a subcarrier indicated by the transmission comb.

In a eleventh possible implementation mode of the second aspect according to the second aspect or any one of the first to the tenth possible implementation modes of the second aspect, the random access response does not include timing alignment information;

after the receiving, by the user equipment, a random access response transmitted by the network side device, further including:

performing, by the user equipment, uplink data transmission, and during the transmission, according to the random access response, not adjusting a transmission time of the uplink data.

A third aspect of the present disclosure provides a network side device, including:

a receiving module, configured to receive a random access preamble signal transmitted by a user equipment, where duration of the random access preamble signal is one single carrier frequency division multiple access SC-FDMA symbol or one orthogonal frequency division multiplexing OFDM symbol;

a processing module, configured to generate a random access response according to the random access preamble signal received by the receiving module;

a transmitting module, configured to transmit the random access response generated by the processing module to the user equipment.

In a first possible implementation mode of the third aspect according to the third aspect, the processing module is further configured to transmit a signaling to the user equipment via the transmitting module, where the signaling is used to indicate that the duration of the random access preamble signal currently used by the user equipment is one SC-FDMA symbol or one OFDM symbol.

In a second possible implementation mode of the third aspect according to the first possible implementation mode of the third aspect, the network side device is a base station of a small cell, and/or, the processing module is further configured to, before the transmitting module transmits the signaling to the user equipment, determine that the user equipment does not need to execute uplink time synchronization.

In a third possible implementation mode of the third aspect according to the third aspect, or the first to the second possible implementation modes of the third aspect, the processing module is further configured to determine a physical random access channel PRACH resource band or resource band pair used to carry the random access preamble signal of the user equipment;

the transmitting module is further configured to transmit, to the user equipment, a transmission period of the PRACH resource band or resource band pair, a transmission offset of the PRACH resource band or resource band pair in each transmission period, and a frequency position of the PRACH resource band or resource band pair.

In a fourth possible implementation mode of the third aspect according to the third possible implementation mode of the third aspect, the transmitting module is further configured to transmit one type of following information or an arbitrary combination thereof:

when bandwidth of the PRACH resource band or resource band pair is configurable, frequency domain bandwidth of the PRACH resource band or resource band pair;

when the PRACH resource band or resource band pair supports frequency hopping, frequency hopping information of the PRACH resource band or resource band pair, where the frequency hopping information includes any one of or a combination of: information about whether the frequency hopping is performed on the PRACH resource band or resource band pair, and frequency hopping bandwidth of the PRACH resource band or resource band pair.

In a fifth possible implementation mode of the third aspect according to the third possible implementation mode of the third aspect or the fourth possible implementation mode of the third aspect, the transmitting module is further configured to transmit a signaling to the user equipment, where the signaling is used to indicate a cyclic shift interval between two adjacent random access preamble signals which are borne on the PRACH resource band or resource band pair.

In a sixth possible implementation mode of the third aspect according to any one of the third to the fifth possible implementation modes of the third aspect, the processing module is further configured to determine that the PRACH resource band or resource band pair is not used to carry a physical uplink shared channel.

In a seventh possible implementation mode of the third aspect according to the third aspect or any one of the first to the sixth possible implementation modes of the third aspect, the processing module is further configured to, when determining that a length of a preamble sequence of the random access preamble signal is 12 or 24, determine that the random access preamble signal takes a sequence, which is based on quaternary phase shift keying and searched by a computer, as the preamble sequence; when determining that the length of the preamble sequence of the random access preamble signal is greater than or equal to 36, and smaller than or equal to 72, determine that the random access preamble signal takes a Zadoff-Chu sequence as the preamble sequence.

In a eighth possible implementation mode of the third aspect according to the third aspect or any one of the first to the seventh possible implementation modes of the third aspect, the processing module is further configured to determine a sequence group number and a base sequence number of the random access preamble signal, where the determined sequence group number is consistent with a sequence group number of a sounding reference signal or a physical uplink shared channel demodulation reference signal, and the determined base sequence number is consistent with a base sequence number of the sounding reference signal or the physical uplink shared channel demodulation reference signal;

the transmitting module is further configured to transmit the sequence group number and the base sequence number determined by the processing module to the user equipment.

In a ninth possible implementation mode of the third aspect according to the third aspect or any one of the first to the eighth possible implementation modes of the third aspect, the processing module is further configured to determine a symbol configured to carry a PRACH resource band or resource band pair of the random access preamble signal in a subframe, where for a frequency division duplexing system, the symbol is last one SC-FDMA symbol or OFDM symbol in an uplink subframe; or, for a time division duplexing system, the symbol is last one or last two SC-FDMA symbols or OFDM symbols in an uplink subframe or a special subframe.

In a tenth possible implementation mode of the third aspect according to the third aspect or any one of the first to the ninth possible implementation modes of the third aspect, the processing module is further configured to determine that the random access preamble signal adopts a mapping manner with one subcarrier interval in a frequency domain, and transmit a transmission comb of the random access preamble signal to the user equipment via the transmitting module.

In a eleventh possible implementation mode of the third aspect according to the third aspect or any one of the first to the tenth possible implementation modes of the third aspect, the random access response transmitted by the transmitting module does not include timing alignment information.

A fourth aspect of the present disclosure provides a user equipment, including:

a generating module, configured to generate a random access preamble signal, where duration of the random access preamble signal is one single carrier frequency division multiple access SC-FDMA symbol or one orthogonal frequency division multiplexing OFDM symbol;

a transmitting module, configured to transmit the random access preamble signal generated by the generating module to a network side device;

a receiving module, configured to, after the transmitting module transmits the random access preamble signal, receive a random access response transmitted by the network side device.

In a first possible implementation of the fourth aspect, according to the fourth aspect, the receiving module is further configured to receive a signaling transmitted by the network side device, where the signaling is used to indicate that the duration of the random access preamble signal currently used by the user equipment is one SC-FDMA symbol or one OFDM symbol;

the generating module is further configured to generate the random access preamble signal according to the signaling received by the receiving module.

In a second possible implementation mode of the fourth aspect according to the first possible implementation mode of the fourth aspect, the user equipment locates in a small cell;

and/or, the signaling received by the receiving module is transmitted after the network side device determines that the user equipment does not need to execute uplink time synchronization.

In a third possible implementation mode of the fourth aspect according to the fourth aspect, the first possible implementation mode of the fourth aspect or the second possible implementation mode of the fourth aspect, the user equipment further includes a determining module;

the receiving module is further configured to, before the transmitting module transmits the random access preamble signal to the network side device, receive information about a physical random access channel PRACH resource band or resource band pair configured to carry the random access preamble signal of the user equipment, where the information is transmitted by the network side device, and the information includes: a transmission period of the PRACH resource band or resource band pair, a transmission offset of the PRACH resource band or resource band pair in each transmission period, and a frequency domain position of the PRACH resource band or resource band pair;

the determining module is configured to, before the transmitting module transmits the random access preamble signal to the network side device, determine, according to the information about the PRACH resource band or resource band pair, a PRACH used to carry the random access preamble signal of the user equipment;

the transmitting module is specifically configured to transmit the random access preamble signal generated by the generating module to the network side device on the PRACH determined by the determining module.

In a fourth possible implementation mode of the fourth aspect according to the third possible implementation mode of the fourth aspect, the information about the PRACH resource band or resource band pair received by the receiving module further includes one type of following information or a combination thereof:

when bandwidth of the PRACH resource band or resource band pair is configurable, frequency domain bandwidth of the PRACH resource band or resource band pair;

when the PRACH resource band or resource band pair supports frequency hopping, frequency hopping information of the PRACH resource band or resource band pair, the frequency hopping information includes any one of or a combination of: information about whether the frequency hopping is performed on the PRACH resource band or resource band pair, and frequency hopping bandwidth of the PRACH resource band or resource band pair.

In a fifth possible implementation mode of the fourth aspect according to the third or the fourth possible implementation mode of the fourth aspect, the receiving module is further configured to, before the transmitting module transmits the random access preamble signal to the network side device, receive a signaling transmitted by the network side device, where the signaling is used to indicate a cyclic shift interval between two adjacent random access preamble signals which are borne on the PRACH resource band or resource band pair;

the generating module is specifically configured to generate the random access preamble signal according to the cyclic shift interval indicated by the signaling received by the receiving module.

In a sixth possible implementation mode of the fourth aspect according to the fourth aspect or any one of the first to the fifth possible implementation modes of the fourth aspect, the user equipment further includes a determining module;

the determining module is configured to, before the transmitting module transmits the random access preamble signal to the network side device, when determining that a length of a preamble sequence of the random access preamble signal is 12 or 24, determine that the random access preamble signal takes a sequence, which is based on quaternary phase shift keying and searched by a computer, as the preamble sequence; when determining that the length of the preamble sequence of the random access preamble signal is greater than or equal to 36, and smaller than or equal to 72, determine that the random access preamble signal takes a Zadoff-Chu sequence as the preamble sequence.

In a seventh possible implementation mode of the fourth aspect according to the fourth aspect or any one of the first to the sixth possible implementation modes of the fourth aspect, the receiving module is further configured to, before the transmitting module transmits the random access preamble signal to the network side device, receive a sequence group number and a base sequence number of the random access preamble signal that are transmitted by the network side device; where the sequence group number is consistent with a sequence group number of a sounding reference signal or a physical uplink shared channel demodulation reference signal, and the base sequence number is consistent with a base sequence number of the sounding reference signal or the physical uplink shared channel demodulation reference signal;

the generating module is specifically configured to generate, according to the sequence group number received by the receiving module and the base sequence number received by the receiving module, the random access preamble signal.

In an eighth possible implementation mode of the fourth aspect according to the fourth aspect or any one of the first to the seventh possible implementation modes of the fourth aspect, the user equipment further includes a determining module;

the determining module is configured to determine a symbol configured to carry a PRACH resource band or resource band pair of the random access preamble signal in a subframe, where for a frequency division duplexing system, the symbol is last one SC-FDMA symbol or OFDM symbol in an uplink subframe; or, for a time division duplexing system, the symbol is last one or the last two SC-FDMA symbols or OFDM symbols in an uplink subframe or a special subframe;

the transmitting module is configured to transmit the random access preamble signal generated by the generating module to the network side device on the SC-FDMA symbol or the OFDM symbol determined by the determining module in the subframe.

In a ninth possible implementation mode of the fourth aspect according to the fourth aspect or any one of the first to the eighth possible implementation modes of the fourth aspect, the user equipment further includes a determining module;

the determining module is configured to, before the transmitting module transmits the random access preamble signal to the network side device, determine that the random access preamble signal adopts a mapping manner with one subcarrier interval in a frequency domain;

the receiving module is further configured to receive a transmission comb of the random access preamble signal transmitted by the network side device;

the transmitting module is specifically configured to transmit the random access preamble signal on a subcarrier indicated by the transmission comb received by the receiving module.

In a tenth possible implementation mode of the fourth aspect according to the fourth aspect or any one of the first to the ninth possible implementation modes of the fourth aspect, the random access response received by the receiving module does not include timing alignment information;

the transmitting module is further configured to, after the receiving module receives a random access response transmitted by the network side device, perform uplink data transmission, and during the transmission, according to the random access response, not adjust a transmission time of the uplink data.

A fifth aspect of the present disclosure provides a network side device, including: a transmitter, a receiver, a memory and a processor which is coupled with the transmitter, the receiver and the memory respectively, where the memory stores a series of program codes, and the processor is configured to call the program codes stored in the memory to execute the method according to the first aspect or any one of the first to the eleventh possible implementation modes of the first aspect.

A sixth aspect of the present disclosure provides a user equipment, including: a transmitter, a receiver, a memory and a processor which is coupled with the transmitter, the receiver and the memory respectively, where the memory stores a series of program codes, and the processor is configured to call the program codes stored in the memory to execute the method according to the second aspect or any one of the first to the eleventh possible implementation modes of the second aspect.

According to the radio communication method, the network side device and the user equipment according to the present disclosure, duration of a random access preamble signal transmitted by a user equipment is one single carrier frequency division multiple access (Single-Carrier Frequency Division Multiple Access; SC-FDMA for short) symbol or one orthogonal frequency division multiplexing (Orthogonal Frequency Division Multiplexing; OFDM for short) symbol, thus air interface overhead of random access can be greatly reduced in a condition that a user equipment can access a cell randomly. Where, the cell may be a small cell or other similar cells.

BRIEF DESCRIPTION OF DRAWINGS

To describe the technical solutions in embodiments of the present disclosure or in the prior art more clearly, the following briefly introduces the accompanying drawings needed for describing the embodiments or the prior art. Apparently, the accompanying drawings in the following description illustrate merely some embodiments of the present disclosure, and persons of ordinary skill in the art may still derive other drawings from these accompanying drawings without creative efforts.

DESCRIPTION OF EMBODIMENTS

In order to make the purpose, technical solutions and advantages of the present disclosure more clear, the technical solution of the present disclosure is hereinafter clearly and completely described in detail with reference to the accompanying drawings. It is evident that the embodiments are only some exemplary embodiments of the present disclosure, rather than all embodiments of the present disclosure. Other embodiments that those skilled in the art obtain based on the embodiments of the present disclosure also fall within the protection scope of the present disclosure.

In following embodiments of the present disclosure, a network side device refers to a node sending data on a downlink channel, such as a base station. For a device to device (Device to Device; D2D for short) system, the network side device may be a UE, namely a UE sending data to another UE on the downlink channel.

Figure 1:
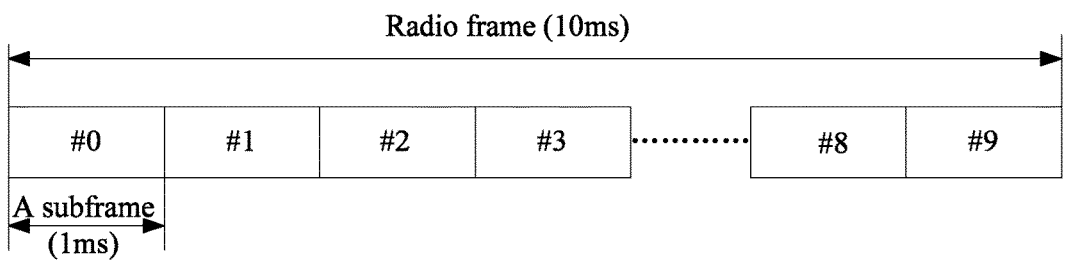
FIG. 1 is a schematic view of an embodiment of a frame structure according to the present disclosure.

In order to make the embodiments of the present disclosure more clear, a frame structure in a system is simply introduced here. FIG. 1 is a schematic diagram of an embodiment of a frame structure according to the present disclosure. As shown in FIG. 1, a time domain in the system is identified by a radio frame (Radio Frame), each radio frame includes 10 subframes, where the length of a subframe is 1 millisecond (ms), and each subframe includes 12 or 14 OFDM symbols (symbol), where an uplink symbol is referred to as an SC-FDMA symbol, and a downlink symbol is referred to as an OFDM symbol. It should be noted that, if an uplink multiple access manner of orthogonal frequency division multiple access (Orthogonal Frequency Division Multiple Access; OFDMA for short) is introduced in a subsequent technology, an uplink symbol may also be called as an OFDM symbol. For a Small Cell, typical configuration of each subframe is 14 symbols. Each symbol is composed of a cyclic prefix (Cyclic Prefix; CP for short) and a useful symbol. For a frequency division duplexing (Frequency Division Duplexing; FDD for short) system, each subframe includes 2 slots (slot). For a time division duplexing (Time Division Duplexing; TDD for short) system, subframe #1 is a special subframe (special subframe), subframe 6 is set as a special subframe or a downlink subframe according to TDD uplink and downlink configuration. The special subframe is composed of a downlink pilot timeslot (Downlink Pilot TimeSlot; DwPTS for short), a guard period (Guard Period; GP for short) and an uplink pilot timeslot (Uplink Pilot TimeSlot; UpPTS for short).

In a Small Cell, a random access may not need to realize uplink synchronization. A maximum coverage range of the Small Cell is 200 meters, and thus a round trip delay (Round Trip Delay; RTD for short) of a signal is 1.35 microsecond (μs), a downlink synchronization error is usually −1.175 μs to 1.175 μs, so the maximum uncertainty of uplink timing is 2.525 μs, which is much smaller than duration of the CP. When uncertainty time is shorter than the CP, a base station needs not to acquire a timing advance (Timing Advance; TA for short) of each UE, and thereby needs not to perform the uplink synchronization.

When the uplink synchronization is unnecessary, a random access preamble (preamble) signal transmitted by a UE may be simplified to a notification signal, notifying the base station that the UE needs to perform operations such as initial access, wireless connection re-establishment, requesting an uplink resource or handover etc. Based on this purpose, a time-frequency domain resource occupied by the random access preamble signal may be reduced. The Small Cell is mentioned above, for other similar cells, if there is no need to perform the uplink timing or the uplink time synchronization via the random access, then processes for these cells are similar to that for the Small Cell. Description will be made in the following by taking the Small Cell as an example.

In the present disclosure, a design of a random access preamble signal includes: a structure of the random access preamble signal.

Figure 2:
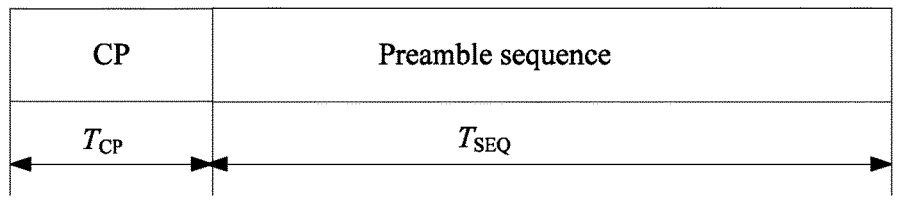
FIG. 2 is a schematic view of an embodiment of a random access preamble signal according to the present disclosure.

Specifically, FIG. 2 is a schematic diagram of an embodiment of a random access preamble signal according to the present disclosure. As show in FIG. 2, the random access preamble signal includes two parts which are a CP and a preamble (Preamble). In FIG. 2, $T_{CP}$ identifies duration that the CP occupies, $T_{SEQ}$ represents duration that the preamble signal occupies. The duration of the random access preamble signal is set to be one symbol time, namely one SC-FDMA symbol time or one OFDM symbol time. If the duration of the random access preamble signal is smaller than one symbol time, an interval between its subcarriers may be bigger than current 15 KHz, in this way, a length of a preamble sequence which can be supported in certain bandwidth may be reduced, thus the number of preamble sequences that can be used may be reduced, and therefore, the number of random access users that can be supported on a same resource may be reduced. Hence, in the present disclosure, preferably, the duration of the random access preamble signal is one SC-FDMA symbol time or one OFDM symbol time. Certainly, if the CP is not added into the random access preamble signal, then the duration of the random access preamble signal may be set to be less than one symbol time, and the specific time may be one symbol time minus the time that the CP needs.

Hereinafter, based on the structure of the designed random access preamble signal, a preamble sequence of the random access preamble signal also can be designed.

Specifically, the preamble sequence may be generated by performing a cyclic shift to a base sequence $\bar{r}_{u,v}(n)$. The base sequences are divided into 30 groups, which are identified by group numbers (group number) u∈{0, 1, . . . , 29}, where v is a base sequence number (base sequence number) in a group. When a length $M_{SC}$ of the preamble sequence is smaller than or equal to 60, there is only one base sequence (namely v=0) in each group; when the length $M_{SC}$ of the preamble sequence is greater than or equal to 72, there are two base sequences (namely v=0,1) in each group.

The aforementioned preamble sequences may be represented by formula (1).

$$r_{u,v}^{(\alpha)}(n)=e^{j\alpha n}\bar{r}_{u,v}(n),\ 0 \le n < M_{SC} \quad (1)$$

In the formula (1), $r_{u,v}^{(\alpha)}(n)$ is the preamble sequence, $\bar{r}_{u,v}(n)$ is the base sequence, α is the cyclic shift, and $M_{SC}$ is the length of the preamble sequence.

Performing cyclic shift to the base sequence is for supporting more preamble sequences and better orthogonality is achieved among multiple sequences obtained after cyclic shift is performed to a same base sequence. It should be noted that, a linear phase rotation in a frequency domain is equivalent to a cyclic shift in a time domain. The cyclic shift supported by the random access preamble signal may be configured by a higher layer signaling.

For determination of the preamble sequence, when $M_{SC}$ is 12 and 24, a special sequence which is based on quaternary phase shift keying (Quadrature Phase Shift Key; QPSK for short) and searched by a computer, may be used as the preamble sequence. When $M_{SC}$ is greater than or equal to 36, and smaller than or equal to 72, a Zadoff-Chu (ZC) sequence may be used as the preamble sequence. For example, a cyclic extension of a Zadoff-Chu (ZC) sequence whose length is $M_{ZC}$ may be adopted, here, $M_{ZC}$ is a maximum prime number which is not greater than $M_{SC}$, for example: when $M_{SC}$=48, the maximum prime number which is not greater than 48 is 47, namely $M_{ZC}$=47, that is to say, the preamble sequence with $M_{SC}$ being equal to 48 is obtained by cyclically extending a ZC sequence whose length is 47. Certainly, if $M_{SC}$ is greater than 72, a ZC sequence may also be adopted as the preamble sequence.

After determining the preamble sequence, the sequence group number and the base sequence number of the preamble signal may be determined further.

Where, the sequence group number of the random access preamble signal may be consistent with a sequence group number of a sounding reference signal. A sequence group number u at slot $n_s$ is determined by a group hopping pattern $f_{gh}(n_s)$) and a sequence shift pattern $f_{ss}$, namely, $u=(f_{gh}(n_s)+f_{ss})$ mod 30, where, there are 17 group frequency hopping patterns and 30 sequence shift patterns. Whether to enable the group hopping (namely whether $f_{gh}(n_s)$ isn't 0) is configured by a higher layer signaling. When $f_{gh}(n_s)$ is not 0, namely when the group hopping is enabled, the value of $f_{gh}(n_s)$ is determined according to a cell identifier (Cell Identifier) and changes along with the slot. When the random access preamble signal follows a design structure of the sounding reference signal (Sounding Reference Signal; SRS for short), $f_{ss}$ is determined according to the cell identifier, $f_{SS}=N_{ID}^{cell}$ mod 30, where $N_{ID}^{cell}$ the cell identifier. Where, the higher layer signaling (High Layer Signaling) is a signaling coming from a higher layer (layer) and transmitted at a lower transmission frequency with respect to a physical layer signaling, and includes a radio resource control (Radio Resource Control; RRC for short) signaling and a media access control (Media Access Control; MAC for short) signaling and etc.

Or, the sequence group number of the random access preamble signal is set to be consistent with a sequence group number of a physical uplink shared channel demodulation reference signal (Physical Uplink Shared Channel Demodulation Reference Signal; PUSCH DMRS for short). When the random access preamble signal follows a design structure of the PUSCH DMRS, $f_{ss}$ is determined according to the cell identifier and $\Delta_{ss} \in \{0, 1, \ldots, 29\}$ notified by a higher layer signaling.

The base sequence number of the random access preamble signal may also be consistent with a base sequence number of the sounding reference signal, and is consistent with a base sequence number of the PUSCH DMRS, since the base sequence numbers of the sounding reference signal and the PUSCH DMRS are the same. When $M_{SC}$ is smaller than or equal to 60, there is only one base sequence (namely v=0) in each group; when $M_{SC}$ is greater than or equal to 72, there are two base sequences (namely v=0,1) in each group. At this time, whether to enable the sequence hopping (Sequence hopping) may be configured by a higher layer signaling. When enabled, v changes between 0 and 1; when disabled, v is 0.

The aforementioned setting solution for the sequence group number and the base sequence number adequately takes into account the problem of interferences among the random access preamble signal and other signals. If the sequence group number and the base sequence number are consistent with those of the sounding reference signal, then it is ensured that sequences of the random access preamble signal and the sounding reference signal are orthogonal when time-frequency resources of them are the same, thereby ensuring that the interference between the random access preamble signal and the sounding reference signal is the minimum. It is similar to the PUSCH DMRS.

Further, on the basis of having designed the structure of the random access preamble signal, a time-frequency resource of the random access preamble signal may also be designed.

A time-frequency resource used for transmitting the random access preamble signal is called a physical random access channel (Physical Random Access Channel; PRACH for short). A PRACH resource is distinguished by a time domain, a frequency domain and a code domain. Multiple PRACH resources with a same time-frequency domain identification are collectively called a PRACH resource band, the multiple PRACH resources included in one PRACH resource band is distinguished by the code domain. In the time domain, one PRACH resource band occupies one SC-FDMA symbol or one OFDM symbol. For a FDD system, the PRACH resource band locates at the last one SC-FDMA symbol or one OFDM symbol of an uplink subframe. For a TDD system, the PRACH resource band may not only locate at the last one SC-FDMA symbol or one OFDM symbol of an uplink subframe, but also may locate at the last one or the last two SC-FDMA symbols or OFDM symbols of a special subframe. Or, the PRACH resource band may locate at a SC-FDMA symbol or an OFDM symbol which can transmit the PUSCH DMRS, namely the fourth SC-FDMA symbol or OFDM symbol in an uplink slot. In the frequency domain, one PRACH resource band occupies N physical resource blocks (Physical Resource Block; PRB for short), namely frequency domain bandwidth of the PRACH resource band is N PRBs. N is a positive integer smaller than or equal to 110, and may be notified by a higher layer signaling or be pre-defined in a standard. Preferably, in order to be compatible with a minimum uplink bandwidth, N is a positive integer smaller than or equal to 6. N may also be an integral multiple of 4, namely N=4×M (M is a positive integer smaller than 24), preferably, N is a fixed value 4.

A same design as the aforementioned design of the time-frequency resource of the random access preamble signal may be also adopted at a UE side, that is, the network side device and the UE may respectively determine the time-frequency resource of the random access preamble signal. Certainly, the network side device may also notify the UE.

The random access preamble signal may be mapped with one subcarrier interval, and this needs a transmission comb (Transmission comb) of the random access preamble signal to be broadcasted via a higher layer signaling, where the transmission comb indicates whether a subcarrier with an even number or a subcarrier with an odd number is used. Two PRACH resource bands corresponding to two transmission combs occupying a same PRB may be called a PRACH resource band pair.

When the PRACH resource band locates at the last one SC-FDMA symbol or OFDM symbol of an uplink subframe, in order to avoid a collision between the PRACH and the PUSCH, it is necessary to notify the UE or pre-define that the PUSCH cannot be transmitted on a time-frequency resource of the PRACH.

In the present disclosure, the design of the PRACH may be more compatible with existing systems, especially it is not necessary to introduce a new limitation on PUSCH transmission and a new design on the size of a PUSCH transmission block.

For the PRACH, a corresponding resource identification can also be set.

Specifically, a PRACH resource is identified by a time domain, a frequency domain and a code domain. A time domain identification (t_id) is a subframe number in a radio frame, where 0≤t_id<10. A frequency domain identification (f_id) is an identification of the PRACH resource band or the PRACH resource band pair on a frequency band in a subframe. A frequency domain position in a subframe, of a PRACH resource band or a PRACH resource band pair identified by each f_id, may be configured by a base station and then be notified to the UE, or be pre-defined. Since a random access radio network temporary identity (Random Access Radio Network Temporary Identity; RA-RNTI for short)=1+t_id+10×f_id, while a range of the RA-RNTI is 1 to 60, then in order to be compatible with RA-RNTI values in existing systems, a range of the RA-RNTI in a Small Cell according to the present disclosure is still 0≤f_id<6, f_id and the code domain identification are identified in an ascending order according to a cyclic shift, where the code domain identification may be regarded as a preamble identification.

For the PRACH, a corresponding power control can be set.

The power control of the PRACH may adopt a mechanism allowing a power rise. A pathloss (pathloss) and an initial transmission power of the PRACH relate to a sequence length of the PRACH. The PRACH transmission power will increase for each unsuccessful random access attempt.

In the following, a method provided by the present disclosure is illustrated by taking the network side device being a base station as an example.

Figure 3:
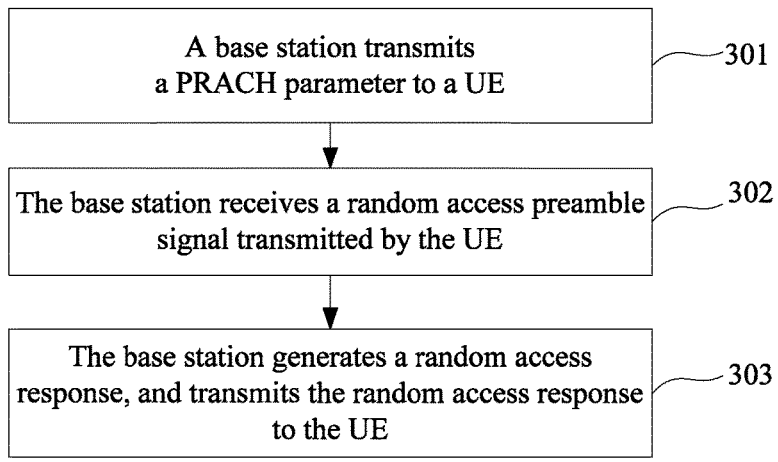
FIG. 3 is a flowchart of an embodiment of a radio communication method according to the present disclosure.

FIG. 3 is a flowchart of an embodiment of a radio communication method according to the present disclosure As shown in FIG. 3, the radio communication method may include:

Step 301. A base station transmits a PRACH parameter to a UE.

Firstly, it should be noted that the base station may not transmit the PRACH parameter to the UE. The base station and the UE may determine the PRACH parameter according to a predefined manner or other manners. The following mainly describes specific implementation of the base station transmitting the PRACH parameter to the UE.

Specifically, before the UE transmits a random access preamble signal, the base station needs to transmit a PRACH parameter to the UE. The PRACH parameter may include any one or combination of a format of the random access preamble signal, time-frequency resource information of the PRACH, code domain resource information of the PRACH, a step size of power increase of the PRACH and a parameter for UE in a non-contention mechanism.

1) The base station notifies the format of the random access preamble signal.

The random access preamble signal designed in the present disclosure adopts a new format, which may be named as preamble format 5 (certainly it is only an example, and is not limited to this name). In existing systems, there are 4 kinds of preamble formats, plus the format newly designed in the present disclosure, there are 5 kinds of preamble formats in total. Hence, the base station needs to configure a preamble format which is currently used, and notifies the UE via a signaling. Specifically, two methods may be adopted: one method is to use a reserved state of an existing PRACH Configuration Index (PRACH Configuration Index) to indicate the preamble format 5, for example, in a FDD system, at least one of reserved states of the PRACH Configuration Index which are 30, 46, 60, 61 and 62 may be used to indicate the preamble format 5, and in a FDD system, at least one of the reserved states of the PRACH Configuration Index which are 58, 59, 60, 61, 62 and 63 may be used to indicate the preamble format 5; the other method is to use an additional higher layer signaling to notify the preamble format 5.

In the embodiment of the present disclosure, the duration of the random access preamble signal is limited within one symbol time, i.e., within one SC-FDMA symbol or one OFDM symbol.

2) The base station notifies the time-frequency resource information of the PRACH.

In each subframe, L PRACH resource band(s) may be configured, where L is an integer greater than or equal to 0. The base station may configure a time-frequency position of the PRACH resource band or resource band pair via a higher layer signaling, where content of the signaling includes information such as a transmission period of the PRACH resource band or resource band pair and a transmission offset (offset) in each transmission period; and a frequency domain position (i.e. a starting point in the frequency domain) of the PRACH resource band or resource band pair. Where the transmission period of the PRACH resource band or resource band pair and the transmission offset (offset) in each transmission period may adopt a transmission period and a transmission offset defined by SRS, or may also adopt a transmission period and a transmission offset defined by an existing PRACH.

The content of the signaling may also include any one or a combination of the followings: when bandwidth of the PRACH is configurable, frequency domain bandwidth of the PRACH resource band or resource band pair; when the PRACH resource band or resource band pair supports frequency hopping, frequency hopping information of the PRACH resource band or resource band pair notified by the base station, where the frequency hopping information includes information about whether the frequency hopping is performed on the PRACH resource band or resource band pair, and frequency hopping bandwidth of the PRACH resource band or resource band pair.

Besides, in order to save overhead, a reserve state of the existing PRACH Configuration Index may be adopted to notify the time-frequency resource information of the PRACH.

3) The base station notifies the code domain information of the PRACH.

Multiple PRACH resources included in one PRACH resource band is distinguished via the code domain. Preferably, different code resources are generated after performing different cyclic shifts to a same base sequence. The different code domain resources corresponding to a PRACH resource band may be configured via a higher layer signaling. For a Small Cell, J preamble sequences (where J is a positive integer) are supported on each PRACH resource band, the preamble sequences are generated by cyclically shifting the base sequence, $J=\lfloor M_{SC}/N_{CS} \rfloor$, where $\lfloor \ \rfloor$ represents rounding down, $M_{SC}$ is the length of the preamble sequence, $N_{CS}$ is used to indicate a cyclic shift interval, and this cyclic shift interval is a cyclic shift interval between two adjacent preamble sequences which are generated from a same base sequence. Therefore, the cyclic shift $$\alpha = \begin{cases} \frac{v \cdot N_{CS}}{M_{SC}} & v = 0, 1, \ldots, \lfloor M_{SC}/N_{CS} \rfloor - 1, N_{CS} \neq 0 \\ 0 & N_{CS} = 0 \end{cases}.$$

Hence, the base station may notify the UE of the code domain resource information on a PRACH resource band via $N_{CS}$.

4) The base station notifies the step size of the power increase of the PRACH.

Specifically, the base station may notify the UE of the step size of the transmission power increase of the PRACH via a higher layer signaling.

5) The base station notifies the parameter for UE in the non-contention mechanism.

The random access is divided into a contention based random access (contention based random access) and a non-contention based random access (non-contention based random access). For the non-contention based random access, the base station allocates a dedicated random access preamble signal to the UE. The base station may allocate the dedicated random access preamble signal to the UE via a physical downlink control channel order (Physical Downlink Control Channel order; PDCCH order for short). At present, there are 64 preamble sequences available in each cell, so 6-bit information in the PDCCH order is used for indicating a preamble index/identifier (preamble index/identifier), the preamble sequences in the Small Cell may be reduced subsequently, and thereby there may be redundant bits and these redundant bits may further indicate the time-frequency resource of the PRACH.

Besides, in order to avoid a collision between the PRACH and the PUSCH, it is necessary to notify the UE or pre-define that the PUSCH cannot be transmitted on a time-frequency resource of the PRACH.

Step 302. The base station receives a random access preamble signal transmitted by the UE.

In this embodiment, duration of the above random access preamble signal is one SC-FDMA symbol or one OFDM symbol.

The random access preamble signal transmitted by the UE may be generated based on the aforementioned design of the random access preamble signal, which will not be repeated here.

Step 303. The base station generates a random access response, and transmits the random access response to the UE.

In order to respond to a detected random access attempt, the base station generates the random access response (Random Access Response), and transmits the random access response to the UE. The random access response includes a random access preamble identification detected by a network, and responds that this sequence is valid. The random access response is PDCCH scheduling that is scrambled by an RA-RNTI. The RA-RNTI can identify time domain and frequency domain information for transmitting the random access preamble signal.

Since it is not necessary for the Small Cell to perform uplink synchronization, therefore the random access response may not include timing alignment information (Timing Alignment information), and thereby signaling overhead can be saved.

In the aforementioned embodiment, the duration of the random access preamble signal transmitted by the UE is one SC-FDMA symbol or one OFDM symbol, and thus air interface overhead of random access can be greatly reduced on a premise that a UE in a small cell (Small Cell) can access the small cell randomly. Besides, the design of the PRACH may be more compatible with the existing system, and especially, it is not necessary to introduce a new limitation on PUSCH transmission and a new design on the size of a PUSCH transmission block.

Figure 4:
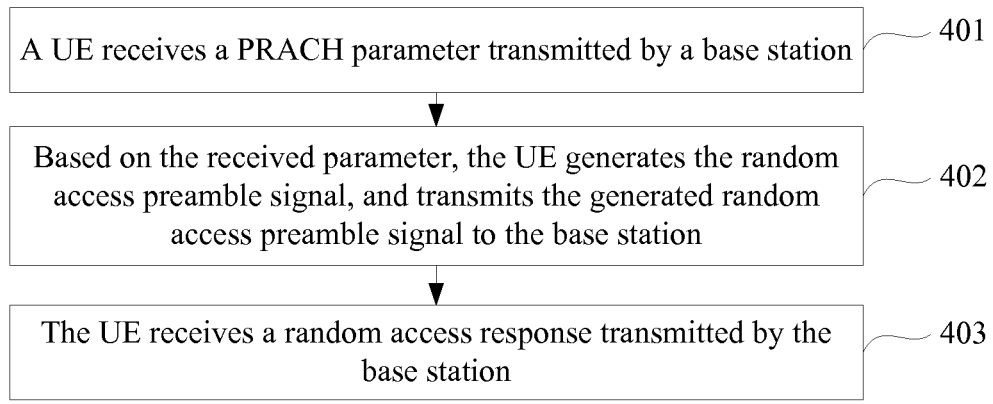
FIG. 4 is a flowchart of another embodiment of a radio communication method according to the present disclosure.

FIG. 4 is a flowchart of another embodiment of a radio communication method according to the present disclosure. As shown in FIG. 4, the radio communication method may include:

Step 401. A UE receives a PRACH parameter transmitted by a base station.

Specifically, before the UE transmits a random access preamble signal, the UE needs to receive the PRACH parameter sent by the base station. The PRACH parameter may include one of or a combination of a format of the random access preamble signal, time-frequency resource information of the PRACH, code domain resource information of the PRACH, a step size of power increase of the PRACH and a UE parameter in a non-contention mechanism.

It should be noted that since the method flow at the UE side relates to the method flow at the base station side, except that the base station side is a transmitting end of the PRACH parameter while the UE is a receiving end of the PRACH parameter, thus for detailed descriptions about the PRACH parameter, introductions in the embodiment as shown in FIG. 3 according to the present disclosure may be referred to. Only a simple description of each parameter is included here.

In these PRACH parameters, the format of the random access preamble signal is: duration of a currently used random access preamble signal being one SC-FDMA symbol or one OFDM symbol. Moreover, the format may be transmitted to the UE after the base station determines that the UE does not need to execute uplink time synchronization.

The aforementioned time-frequency resource information of the PRACH includes: a transmission period of a PRACH resource band or resource band pair, a transmission offset of the PRACH resource band or resource band pair in each transmission period, and a frequency domain position of the PRACH resource band or resource band pair. The time-frequency resource information of the PRACH may further include: when bandwidth of the PRACH resource band or resource band pair is configurable, frequency domain bandwidth of the PRACH resource band or resource band pair; when the PRACH resource band or resource band pair supports frequency hopping, frequency hopping information of the PRACH resource band or resource band pair, where the frequency hopping information includes any one or combination of the followings: information about whether the frequency hopping is performed on the PRACH resource band or resource band pair, and frequency hopping bandwidth of the PRACH resource band or resource band pair.

The code domain resource information of the PRACH includes: information to indicate a cyclic shift interval between two adjacent random access preamble signals which are carried on the PRACH resource band or resource band pair.

Certainly, the UE may not receive the parameter, but determines the above parameter according to a predefined manner or other manners.

For example, as for the duration of the random access preamble signal, the UE may determine the format of the random access preamble signal in a pre-defined manner, i.e., determining that the length of the random access preamble signal is one SC-FDMA symbol or one OFDM symbol.

The UE may also determine the code domain resource information of the PRACH of the random access preamble signal in a pre-defined manner, for example, determining a manner for generating a preamble sequence. Specifically, when determining that a length of the preamble sequence of the random access preamble signal is 12 or 24, the UE may use a sequence which is based on quaternary phase shift keying and searched by a computer, as the aforementioned preamble sequence of the random access preamble signal; when determining that the length of the preamble sequence of the random access preamble signal is greater than or equal to 36, and smaller than or equal to 72, use a Zadoff-Chu sequence as the preamble sequence of the random access preamble signal.

The UE may also determine the time-frequency resource information of the PRACH of the random access preamble signal in a pre-defined manner, for example, determining a symbol used to carry a PRACH resource band or resource band pair of the random access preamble signal in a subframe, and for a frequency division duplexing system, the symbol is the last one SC-FDMA symbol or OFDM symbol in an uplink subframe; or, for a time division duplexing system, the symbol is the last one or the last two SC-FDMA symbols or OFDM symbols in an uplink subframe or a special subframe.

The UE may also determine other time-frequency resource information of the PRACH of the random access preamble signal in a pre-defined manner, for example, determining that the random access preamble signal adopts a mapping manner with one subcarrier interval in a frequency domain. However, in this case, the UE needs a network device to provide a transmission comb of the random access preamble signal, so that the UE may transmit the random access preamble signal on a subcarrier indicated by the transmission comb.

Step 402. Based on the received parameter, the UE generates the random access preamble signal, and transmits the generated random access preamble signal to the base station.

If the received PRACH parameter includes the format of the random access preamble signal, then the UE generates, according to the format, the random access preamble signal the duration of which is one SC-FDMA symbol or one OFDM symbol.

If the received PRACH parameter includes the time-frequency resource information of the PRACH, then the UE determines, according to the information, the PRACH used for carrying the random access preamble signal of the UE. Specifically, for a FDD system, the random access preamble signal generated by the UE may be transmitted on the last one SC-FDMA symbol or OFDM symbol in an uplink subframe, or, for a TDD system, the random access preamble signal generated by the UE may be transmitted on the last one or the last two SC-FDMA symbols or OFDM symbols in an uplink subframe or a special subframe. Or, the UE also may transmit the random access preamble signal on a SC-FDMA symbol or an OFDM symbol on which a PUSCH DMRS can be transmitted.

If the received PRACH parameter includes the code domain resource information of the PRACH, then the UE generates the random access preamble signal according to a cyclic shift interval of the code domain resource information.

If the received PRACH parameter includes a sequence group number and a base sequence number of the random access preamble signal, then the UE generates the random access preamble signal according to the sequence group number and the base sequence number.

Certainly, if there are multiple parameters, the UE may generate the random access preamble signal with an overall consideration of these parameters, and transmits the random access preamble signal.

As previously mentioned, for generating the random access preamble signal by the UE, the UE may not need to receive a parameter, but generates and transmits the random access preamble signal according to a pre-defined design.

For example, in a pre-defined manner, if the UE can determine the format of the random access preamble signal, then can generate the random access preamble signal according to the format; if the UE can determine the preamble sequence of the random access preamble signal, then can generate the random access preamble signal according to the preamble sequence; if the UE can determine the code domain resource information of the PRACH of the random access preamble signal, then can generate the random access preamble signal according to the cyclic shift interval in the code domain resource information; if the UE can determine the time-frequency resource information of the PRACH of the random access preamble signal, then the UE can determine, according to the information, the PRACH used for carrying the random access preamble signal of the UE.

Besides, if the UE can determine other time-frequency resource information of the PRACH of the random access preamble signal in a pre-defined manner, for example, determining that the random access preamble signal adopts a mapping manner with one subcarrier interval in a frequency domain, for this manner, the UE needs to acquire a transmission comb of the random access preamble signal from the base station, then, when transmitting the random access preamble signal, the UE may transmit on a subcarrier indicated by the transmission comb.

Step 403. The UE receives a random access response transmitted by the base station.

In order to determine whether the base station receives the random access preamble signal transmitted by the UE, the UE needs to monitor and receive the random access response. Before acquiring the random access response, the UE needs to detect a PDCCH scrambled by a RA-RNTI at first, then acquires scheduling information of the random access response via the PDCCH, thereby acquiring the random access response.

Besides, the random access response transmitted by the base station does not include timing alignment information; correspondingly, when performing uplink data transmission, according to the random access response, the UE does not adjust a transmission time of the uplink data.

Moreover, in order to avoid a collision between the PRACH and the PUSCH, the UE should not use the PRACH resource band or resource band pair to carry and transmit the PUSCH. As previously mentioned, it may be notified to the UE by the base station, or may be pre-defined.

In the aforementioned embodiment, the duration of the random access preamble signal transmitted by the UE is one SC-FDMA symbol or one OFDM symbol, thus air interface overhead of random access can be greatly reduced on a premise that a UE in a small cell (Small Cell) can access the small cell randomly. Besides, the design of the PRACH may be more compatible with existing systems, and especially, it is not necessary to introduce a new limitation on PUSCH transmission and a new design on the size of a PUSCH transmission block.

Persons of ordinary skill in the art may understand that all or part of the steps in the above method embodiments may be implemented by a program instructing relevant hardware. The program may be stored in a computer readable storage medium. When the program is executed, the foregoing steps in the method embodiments are performed. The aforementioned storage medium includes any medium capable of storing program codes, such as a ROM, a RAM, a magnetic disk, or an optical disk.

Figure 5:
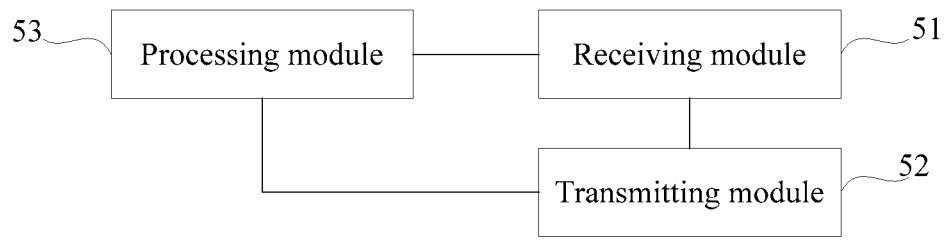
FIG. 5 is a schematic structural diagram of a network side device according to another embodiment of the present disclosure.

FIG. 5 is a schematic structural diagram of an embodiment of a network side device according to the present disclosure. The network side device in this embodiment may implement the flow of the embodiment as shown in FIG. 3 of the present disclosure. As shown in FIG. 5, the network side device may include: a receiving module 51, a transmitting module 52 and a processing module 53.

The receiving module 51 is configured to receive a random access preamble signal transmitted by a UE, where duration of the random access preamble signal is one SC-FDMA symbol or one OFDM symbol.

The processing module 53 is configured to generate a random access response according to the random access preamble signal received by the receiving module 51.

The transmitting module 52 is configured to transmit the random access response generated by the processing module 53 to the UE.

In this embodiment, the processing module 53 is further configured to transmit a signaling to the UE via the transmitting module 52, where the signaling is used to indicate that the duration of the random access preamble signal currently used by the UE is one SC-FDMA symbol or one OFDM symbol. In this way, the UE may generate the random access preamble signal according to the signaling after receiving the signaling.

In this embodiment, the aforementioned network side device may be a base station of a small cell, and/or, the processing module 53 is further configured to, before transmitting, via the transmitting module 52, the signaling to the UE, determine that the UE does not need to execute uplink time synchronization. That is to say, after determining that the UE does not need to execute the uplink time synchronization, the processing module 53 transmits the aforementioned signaling to the UE via the transmitting module 52.

In this embodiment, the processing module 53 is further configured to determine a PRACH resource band or resource band pair used to carry the random access preamble signal of the UE;

the transmitting module 52 is further configured to transmit a transmission period of the PRACH resource band or resource band pair, a transmission offset of the PRACH resource band or resource band pair in each of the transmission period and a frequency domain position of the PRACH resource band or resource band pair, to the UE.

Further, on the basis of transmitting the transmission period of the PRACH resource band or resource band pair, the transmission offset of the PRACH resource band or resource band pair in each of the transmission period, and the frequency domain position of the PRACH resource band or resource band pair, the transmitting module 52 is also configured to transmit one type or any combination of following information:

when bandwidth of the PRACH resource band or resource band pair is configurable, frequency domain bandwidth of the PRACH resource band or resource band pair;

when the PRACH resource band or resource band pair supports frequency hopping, frequency hopping information of the PRACH resource band or resource band pair, where the frequency hopping information includes any one of or a combination of: information about whether the frequency hopping is performed on the PRACH resource band or resource band pair, and frequency hopping bandwidth of the PRACH resource band or resource band pair.

Further, the transmitting module 52 is also configured to transmit a signaling to the UE, where the signaling is used to indicate a cyclic shift interval between two adjacent random access preamble signals which are borne on the PRACH resource band or resource band pair. In this way, after receiving the signaling, the UE may generate the random access preamble signal according to the cyclic shift interval.

Further, in order to avoid a collision between the PRACH and the PUSCH, the processing module 53 is also configured to determine that the PRACH resource band or resource band pair is not used to carry the PUSCH, then the transmitting module 52 may also notify the UE that the PRACH resource band or resource band pair is not used to carry the PUSCH, certainly, that the PUSCH cannot be transmitted on the time-frequency resource of the PRACH may also be pre-defined; in this way, the UE will not use the PRACH resource band or resource band pair to carry the PUSCH.

In this embodiment, the processing module 53 is further configured to, when determining that a length of a preamble sequence of the random access preamble signal is 12 or 24, determine that the random access preamble signal takes a sequence which is based on quaternary phase shift keying and searched by a computer, as the preamble sequence; when determining that the length of the preamble sequence of the random access preamble signal is greater than or equal to 36, and smaller than or equal to 72, determine that the random access preamble signal takes a Zadoff-Chu sequence as the preamble sequence.

In this embodiment, the processing module 53 is further configured to determine a sequence group number and a base sequence number of the random access preamble signal, where the determined sequence group number is consistent with a sequence group number of a SRS or a PUSCH DMRS, the determined base sequence number is consistent with a base sequence number of the SRS or the PUSCH DMRS; then the transmitting module 52 is further configured to transmit the sequence group number and the base sequence number determined by the processing module 53 to the UE. In this way, the UE may generate the random access preamble signal according to the sequence group number and the base sequence number. The aforementioned setting solution for the sequence group number and the base sequence number adequately takes into account the problem of interferences among the random access preamble signal and other signals. If the sequence group number and the base sequence number are consistent with those of SRS, then it can be ensured that when time-frequency resources of the random access preamble signal and the SRS are the same, sequences of them can be orthogonal, thereby ensuring that the interference between the random access preamble signal and the SRS is the minimum. It is similar to the PUSCH DMRS.

In this embodiment, the processing module 53 is further configured to determine a symbol used to carry a PRACH resource band or resource band pair of the random access preamble signal in a subframe, and for a FDD system, the symbol is the last one SC-FDMA symbol or OFDM symbol in an uplink subframe; or, for a TDD system, the symbol is the last one or the last two SC-FDMA symbols or OFDM symbols in an uplink subframe or a special subframe.

In this embodiment, the processing module 53 is further configured to determine that the random access preamble signal adopts a mapping manner with one subcarrier interval in a frequency domain, and transmit a transmission comb of the random access preamble signal to the UE via the transmitting module 52. In this way, the UE may transmit the random access preamble signal on a subcarrier indicated by the transmission comb.

In this embodiment, the random access response transmitted by the transmitting module 52 does not include timing alignment information. In this way, after receiving the random access response, according to the random access response, the UE will not adjust a transmission time of the uplink data in a process of performing uplink data transmission.

In hardware implementation, the aforementioned transmitting module 52 may be a transmitter or a transceiver, the aforementioned receiving module 51 may be a receiver or a transceiver, and the transmitting module 52 and the receiving module 51 may be integrated together to form a transceiving unit, which corresponds to a transceiver in hardware implementation. The aforementioned processing module 53 may be embedded into or separated from a processor of the network side device in the form of hardware, it may also be stored into a memory of the network side device in the form of software, so that the processor calls and executes operations corresponding to the aforementioned modules. This processor may be a central processing unit (CPU), a microprocessor or a single chip microcomputer and etc.

In this embodiment, the network side device refers to a node sending data on a downlink channel, such as a base station. For a D2D system, the network side device may be a UE, namely, a UE sending data to another UE on a downlink channel.

In the aforementioned embodiment, the duration of the random access preamble signal transmitted by the UE is one SC-FDMA symbol or one OFDM symbol, thus air interface overhead of random access can be greatly reduced on a premise that a UE in a small cell (Small Cell) can access the small cell randomly. Besides, the design of the PRACH may be more compatible with existing system, and, especially, it is not necessary to introduce a new limitation on PUSCH transmission and a new design on the size of a PUSCH transmission block.

Figure 6:
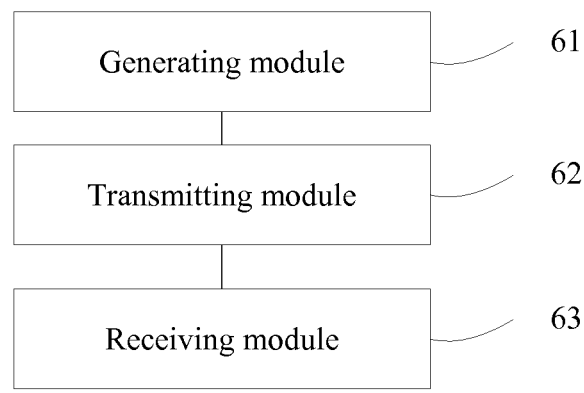
FIG. 6 is a schematic structural diagram of another embodiment of a user equipment according to the present disclosure.

FIG. 6 is a schematic structural diagram of a user equipment according to another embodiment of the present disclosure, the UE in this embodiment may implement the flow of the embodiment shown in FIG. 4 according to the present disclosure. As shown in FIG. 6, the UE may include: a generating module 61, a transmitting module 62 and a receiving module 63.

The generating module 61 is configured to generate a random access preamble signal, where duration of the random access preamble signal is one SC-FDMA symbol or one OFDM symbol; specifically, the generating module 61 may generate the random access preamble signal based on the aforementioned design of the random access preamble signal.

The transmitting module 62 is configured to transmit the random access preamble signal generated by the generating module 61 to a network side device.

The receiving module 63 is configured to, after the transmitting module 62 transmits the random access preamble signal, receive a random access response transmitted by the network side device.

In hardware implementation, the aforementioned transmitting module 62 may be a transmitter or a transceiver, the aforementioned receiving module 63 may be a receiver or a transceiver, and the transmitting module 62 and the receiving module 63 may be integrated together to form a transceiving unit, which corresponds to a transceiver in hardware implementation. The aforementioned generating module 61 may be embedded into or separated from a processor of the UE in the form of hardware, it may also be stored into a memory of the UE in the form of software, so that the processor calls and executes operations corresponding to the aforementioned modules. This processor may be a central processing unit (CPU), a microprocessor or a single chip microcomputer and etc.

In the aforementioned embodiment, the duration of the random access preamble signal transmitted by the UE is one SC-FDMA symbol or one OFDM symbol, thus air interface overhead of random access can be greatly reduced on a premise that a UE in a small cell (Small Cell) can access the small cell randomly. Besides, the design of the PRACH may be more compatible with existing systems, and especially, it is not necessary to introduce a new limitation on PUSCH transmission and a new design on the size of a PUSCH transmission block.

Figure 7:
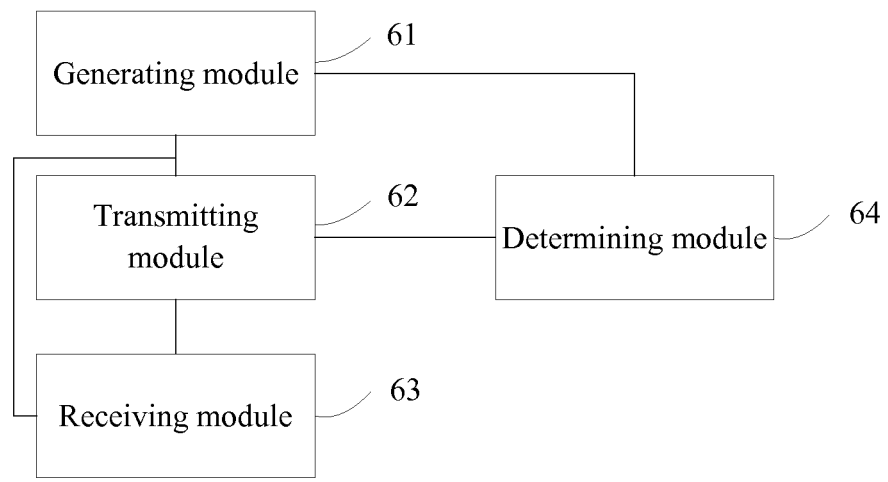
FIG. 7 is a schematic structural diagram of another embodiment of a user equipment according to the present disclosure.

FIG. 7 is a schematic structural diagram of another embodiment of a user equipment according to the present disclosure. Being compared with the UE shown in FIG. 6, the difference is that, in the UE shown in FIG. 7, the receiving module 63 is further configured to receive a signaling transmitted by the network side device, where the signaling is used to indicate that the duration of the random access preamble signal currently used by the user equipment is one SC-FDMA symbol or one OFDM symbol; at this time, the generating module 61 is further configured to generate the random access preamble signal according to the signaling received by the receiving module 63.

In this embodiment, the UE may locate in a small cell; and/or, the signaling received by the receiving module 63 is transmitted after the network side device determines that the UE does not need to execute uplink time synchronization.

Further, the UE may also include: a determining module 64;

the receiving module 63 is further configured to, before the transmitting module 62 transmits the random access preamble signal to the network side device, receive information about a PRACH resource band or resource band pair used to carry the random access preamble signal of the UE, where the information is sent by the network side device, and the information includes a transmission period of the PRACH resource band or resource band pair, a transmission offset of the PRACH resource band or resource band pair in each transmission period, and a frequency domain position of the PRACH resource band or resource band pair; in this way, before the transmitting module 62 transmits the random access preamble signal to the network side device, the determining module 64 may determine, according to the information about the PRACH resource band or resource band pair, a PRACH used to carry the random access preamble signal of the UE. Correspondingly, the transmitting module 62 is specifically configured to transmit the random access preamble signal generated by the generating module 61 on the PRACH determined by the determining module 64 to the network side device.

Further, the information about the PRACH resource band or resource band pair received by the receiving module 63 may also include one type of following information or a combination thereof: when bandwidth of the PRACH resource band or resource band pair is configurable, frequency domain bandwidth of the PRACH resource band or resource band pair; when the PRACH resource band or resource band pair supports frequency hopping, frequency hopping information of the PRACH resource band or resource band pair, where the aforementioned frequency hopping information includes any one of or a combination of: information about whether the frequency hopping is performed on the PRACH resource band or resource band pair, and frequency hopping bandwidth of the PRACH resource band or resource band pair.

Further, the receiving module 63 is further configured to, before the transmitting module 62 transmits the random access preamble signal to the network side device, receive a signaling transmitted by the network side device, where the signaling is used to indicate a cyclic shift interval between two adjacent random access preamble signals which are borne on the PRACH resource band or resource band pair; at this time, the generating module 61 is specifically configured to generate the random access preamble signal according to the cyclic shift interval indicated by the signaling received by the receiving module 63.

Certainly, the UE may not receive the signaling and/or the information of the PRACH resource band or resource band pair transmitted by the network side device, but determine a parameter which is necessary for generating the random access preamble signal according to a pre-defined manner or other manners.

For example, for the duration of the random access preamble signal, the determining module 64 may determine the format of the random access preamble signal in a pre-defined manner, i.e., determining that the length of the random access preamble signal is one SC-FDMA symbol or one OFDM symbol.

The determining module 64 may also determine the code domain resource information of the PRACH of the random access preamble signal in a pre-defined manner, for example, determining a manner for generating a preamble sequence. Specifically, before the transmitting module 62 transmits the random access preamble signal to a network side device, when determining that a length of a preamble sequence of the random access preamble signal is 12 or 24, the determining module 64 may determine that the random access preamble signal takes a sequence, which is based on quaternary phase shift keying and searched by a computer, as the preamble sequence; when determining that the length of the preamble sequence of the random access preamble signal is greater than or equal to 36, and smaller than or equal to 72, the determining module 64 may determine that the random access preamble signal takes a Zadoff-Chu sequence as the preamble sequence.

Besides, the determining module 64 may determine the time-frequency resource information of the PRACH of the random access preamble signal in a pre-defined manner, for example, determining a symbol used to carry the PRACH resource band or resource band pair of the random access preamble signal in a subframe, and for a frequency division duplexing system, the symbol is the last one SC-FDMA symbol or OFDM symbol in an uplink subframe; or, for a time division duplexing system, the symbol is the last one or the last two SC-FDMA symbols or OFDM symbols in an uplink subframe or a special subframe. At this time, the transmitting module 62 may transmit the random access preamble signal generated by the generating module 61 to the network side device on the SC-FDMA symbol or the OFDM symbol determined by the determining module 64 in the subframe.

The determining module 64 may also determine other time-frequency resource information of the PRACH of the random access preamble signal in a pre-defined manner, for example, determining that the random access preamble signal adopts a mapping manner with one subcarrier interval in a frequency domain. However, in this case, the receiving module 63 needs to receive a transmission comb of the random access preamble signal, where the transmission comb is sent by the network device, and then the transmitting module 62 may transmit the random access preamble signal on a subcarrier indicated by the transmission comb received by the receiving module 63.

Further, in this embodiment, the receiving module 63 is also configured to, before the transmitting module 62 transmits the random access preamble signal to a network side device, receive a sequence group number and a base sequence number of the random access preamble signal transmitted by the network side device; where, the sequence group number is consistent with a sequence group number of an SRS or a PUSCH DMRS, the base sequence number is consistent with a base sequence number of the SRS or the PUSCH DMRS. At this time, the generating module 61 is specifically configured to generate, according to the sequence group number received by the receiving module 63 and the base sequence number received by the receiving module 63, the random access preamble signal.

In this embodiment, the random access response received by the receiving module 63 does not include timing alignment information. Further, the transmitting module 62 is also configured to, after the receiving module 63 receives the random access response transmitted by the network side device, perform uplink data transmission, and during a process of the transmission and according to the random access response, do not adjust a transmission time of the uplink data.

In this embodiment, if the receiving module 63 receives a signaling which is transmitted by the network side device and indicates that the duration of the random access preamble signal currently used by the UE is one SC-FDMA symbol or one OFDM symbol, then the generating module 61 may generate, according to the signaling, a random access preamble signal, duration of which is one SC-FDMA symbol or one OFDM symbol.

If the receiving module 63 receives information about the PRACH resource band or resource band pair, then the determining module 64 determines, according to the information, the PRACH used for carrying the random access preamble signal of the UE. Specifically, for a FDD system, the random access preamble signal generated by the generating module 61 may be transmitted on the last one SC-FDMA symbol or OFDM symbol in an uplink subframe, or, for a TDD system, the random access preamble signal generated by the generating module 61 may be transmitted on the last one or the last two SC-FDMA symbols or OFDM symbols in an uplink subframe or a special subframe. Or, the transmitting module 62 also may transmit the aforementioned random access preamble signal on a SC-FDMA symbol or an OFDM symbol that can transmit the PUSCH DMRS.

If the receiving module 63 receives a signaling used to indicate a cyclic shift interval between two adjacent random access preamble signals which are borne on the PRACH resource band or resource band pair, then the generating module 61 may generate the random access preamble signal according to the aforementioned cyclic shift interval.

If the receiving module 63 receives a sequence group number and a base sequence number of the random access preamble signal, then the generating module 61 may generate the random access preamble signal according to the sequence group number and the base sequence number.

Certainly, if the receiving module 63 receives a plurality of signalings and/or parameters, then the generating module 61 may generate the random access preamble signal with an overall consideration of these signalings and/or parameters, and the transmitting module 62 also may transmit the random access preamble signal with an overall consideration of these signalings and/or parameters.

As previously mentioned, for generating the random access preamble signal, the generating module 61 may not need to receive signalings and/or parameters, but generate the random access preamble signal according to a pre-defined design.

For example, in a pre-defined manner, if the determining module 64 can determine a format of the random access preamble signal, then the generating module 61 may generate the random access preamble signal according to the format; if the determining module 64 can determine a preamble sequence of the random access preamble signal, then the generating module 61 may generate the random access preamble signal according to the preamble sequence; if the determining module 64 can determine code domain resource information of the PRACH of the random access preamble signal, then the generating module 61 may generate the random access preamble signal according to a cyclic shift interval in the code domain resource information; if the determining module 64 can determine the time-frequency resource information of the PRACH of the random access preamble signal, then a PRACH used for carrying the random access preamble signal of the UE may be determined according to the information.

Besides, in order to avoid a collision between the PRACH and the PUSCH, the UE should not use the PRACH resource band or resource band pair to carry and transmit the PUSCH. As previously mentioned, it may be notified to the UE by the base station, or may be pre-defined.

In hardware implementation, the aforementioned transmitting module 62 may be a transmitter or a transceiver, the aforementioned receiving module 63 may be a receiver or a transceiver, and the transmitting module 62 and the receiving module 63 may be integrated together to form a transceiving unit, which corresponds to a transceiver in hardware implementation. The aforementioned generating module 61 and the determining module 64 may be embedded into or separated from a processor of the UE in the form of hardware, it may also be stored into a memory of the UE in the form of software, so that the processor calls and executes operations corresponding to the aforementioned modules. This processor may be a central processing unit (CPU), a microprocessor or a single chip microcomputer and etc.

In the aforementioned embodiment, the duration of the random access preamble signal transmitted by the UE is one SC-FDMA symbol or one OFDM symbol, thus air interface overhead of random access can be greatly reduced on a premise that a UE in a small cell (Small Cell) can access the small cell randomly. Besides, the design of the PRACH may be more compatible with existing systems, and especially, it is not necessary to introduce a new limitation on PUSCH transmission and a new design on the size of a PUSCH transmission block.

Figure 8:
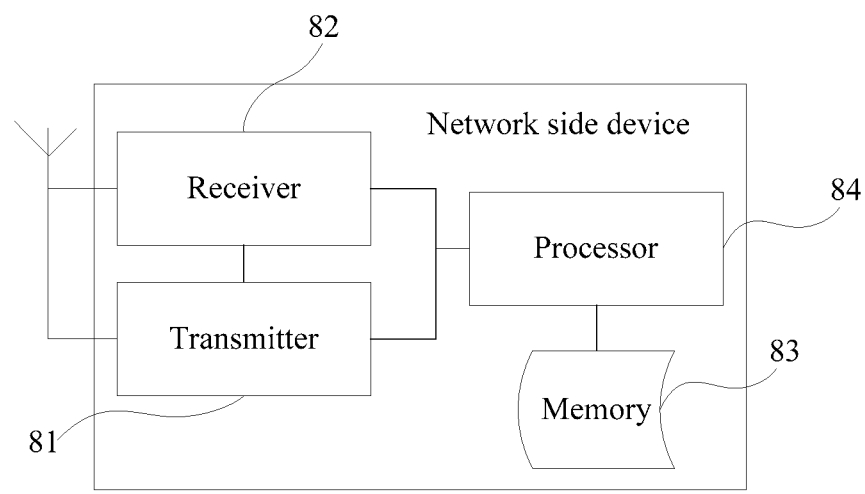
FIG. 8 is a schematic structural diagram of another embodiment of a network side device according to the present disclosure.

FIG. 8 is a schematic structural diagram of a network side device according to another embodiment of the present disclosure. As shown in FIG. 8, the network side device may include a transmitter 81, a receiver 82, a memory 83 and a processor 84 which is coupled with the transmitter 81, the receiver 82 and the memory 83 respectively. Certainly, the network side device may further include general parts, such as an antenna and/or an input-output device and etc, which are not limited here in the embodiment of the present disclosure.

The memory 83 stores a series of program codes, and the processor 84 is configured to call the program codes stored in the memory 83 to execute following operations:

receiving, via the receiver 82, a random access preamble signal transmitted by a UE, where duration of the random access preamble signal is one SC-FDMA symbol or one OFDM symbol;

transmitting, via the transmitter 81, a random access response to the UE.

It should be noted that the network side device shown in FIG. 8 may be used to implement the method provided by the embodiment shown in FIG. 3 of the present disclosure, and descriptions about the random access preamble signal and a signaling, and a PRACH resource band or resource band pair are all the same as those in the method embodiment, which will not be repeated herein.

In this embodiment, the network side device refers to a node sending data on a downlink channel, such as a base station. For a D2D system, the network side device may be a UE, namely a UE sending data to another UE on the downlink channel.

In the aforementioned embodiment, the duration of the random access preamble signal transmitted by the UE is one SC-FDMA symbol or one OFDM symbol, thus air interface overhead of random access can be greatly reduced on a premise that a UE in a small cell (Small Cell) can access the small cell randomly. Besides, the design of the PRACH may be more compatible with existing systems, and especially, it is not necessary to introduce a new limitation on PUSCH transmission and a new design on the size of a PUSCH transmission block.

Figure 9:
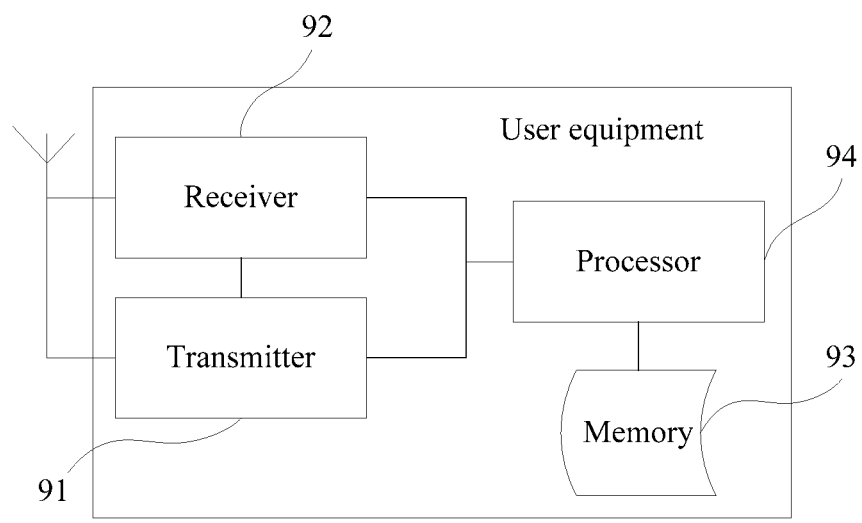
FIG. 9 is a schematic structural diagram of still another embodiment of a user equipment according to the present disclosure.

FIG. 9 is a schematic structural diagram of a user equipment according to another embodiment of the present disclosure. As shown in FIG. 9, the user equipment may include a transmitter 91, a receiver 92, a memory 93 and a processor 94 which is coupled with the transmitter 91, the receiver 92 and the memory 93 respectively. Certainly, the user equipment may further include general parts, such as an antenna and/or an input-output device and etc, which are not limited here in the embodiment of the present disclosure.

The memory 93 stores a series of program codes, and the processor 94 is configured to call the program codes stored in the memory 93 to execute following operations:

generating a random access preamble signal, where duration of the random access preamble signal is one single carrier frequency division multiple access SC-FDMA symbol or one orthogonal frequency division multiplexing OFDM symbol;

transmitting, via the transmitter 91, the random access preamble signal to a network side device;

receiving, via the receiver 92, a random access response transmitted by the network side device.

It should be noted that the user equipment shown in FIG. 9 may be used to implement the method provided by the embodiment shown in FIG. 4 of the present disclosure, and descriptions about the random access preamble signal and a signaling, and a PRACH resource band or resource band pair are all the same as those in the method embodiment, which will not be repeated herein.

In the aforementioned embodiment, the duration of the random access preamble signal transmitted by the UE is one SC-FDMA symbol or one OFDM symbol, thus air interface overhead of random access can be greatly reduced on a premise that a UE in a small cell (Small Cell) can access the small cell randomly. Besides, the design of the PRACH may be more compatible with existing systems, and especially, it is not necessary to introduce a new limitation on PUSCH transmission and a new design on the size of a PUSCH transmission block.

People skilled in the art may understand that an accompanying drawing is only a schematic view of an optional embodiment, the module or the flow in the accompanying drawing is not necessary for implementing the present disclosure.

Persons skilled in the art may understand that modules in the devices of the embodiments may distribute in the devices of the embodiments according to the descriptions of the embodiments, or locate in one or more devices other than the present embodiments via performing corresponding changes. The modules in the aforementioned embodiments may be combined into one module, or further be divided into a plurality of sub-modules.

Finally, it should be noted that the foregoing embodiments are merely intended for describing the technical solutions of the present disclosure other than limiting the present disclosure. Although the present disclosure is described in detail with reference to the foregoing embodiments, a person of ordinary skill in the art should understand that he may still make modifications to the technical solutions described in the foregoing embodiments, or make equivalent replacements to some technical features thereof; however these modifications or replacements will not cause the essence of corresponding technical solutions to depart from the scope of the technical solutions of the embodiments of the present disclosure.

What is claimed is:

1. A radio communication method, comprising:
   determining, by a network side device, that a user equipment does not need to execute uplink time synchronization, wherein the network side device is a base station of a small cell;
   transmitting, by the network side device, a signaling to the user equipment, wherein the signaling indicates that a duration of a random access preamble signal currently used by the user equipment, is one single carrier frequency division multiple access (SC-FDMA) symbol or one orthogonal frequency division multiplexing (OFDM) symbol;
receiving, by the network side device, the random access preamble signal transmitted by the user equipment, wherein the duration of the random access preamble signal is one SC-FDMA symbol or one OFDM symbol, wherein a sequence group number of the random access preamble signal is consistent with a sequence group number of a sounding reference signal or a physical uplink shared channel demodulation reference signal;
generating, by the network side device, a random access response according to the random access preamble signal; and
transmitting the random access response to the user equipment.

2. The method according to claim 1, wherein before the receiving, by a network side device, a random access preamble signal transmitted by a user equipment, further comprising:
determining, by the network side device, a base sequence number of the random access preamble signal, wherein the determined base sequence number is consistent with a base sequence number of the sounding reference signal or the physical uplink shared channel demodulation reference signal; and
transmitting, by the network side device, the determined base sequence number to the user equipment.

3. The method according to claim 1, wherein before the receiving, by a network side device, a random access preamble signal transmitted by a user equipment, further comprising:
determining, by the network side device, a symbol that carries a physical random access channel (PRACH) resource band or resource band pair of the random access preamble signal in a subframe, wherein for a frequency division duplexing system, the symbol is a last one SC-FDMA symbol or OFDM symbol in an uplink subframe, or, for a time division duplexing system, the symbol is a last one or last two SC-FDMA symbols or OFDM symbols in an uplink subframe or a special subframe.

4. The method according to claim 1, wherein the random access response does not comprise timing alignment information.

5. A network side device, comprising:
a receiver, configured to receive a random access preamble signal transmitted by a user equipment, wherein a duration of the random access preamble signal is one single carrier frequency division multiple access (SC-FDMA) symbol or one orthogonal frequency division multiplexing (OFDM) symbol, wherein a sequence group number of the random access preamble signal is consistent with a sequence group number of a sounding reference signal or a physical uplink shared channel demodulation reference signal;
a processor, configured to generate a random access response according to the random access preamble signal received by the receiver; and
a transmitter, configured to transmit the random access response generated by the processor to the user equipment;
wherein the processor is further configured to transmit a signaling via the transmitter to the user equipment, wherein the signaling indicates that the duration of the random access preamble signal currently used by the user equipment is one SC-FDMA symbol or one OFDM symbol;
wherein the network side device is a base station of a small cell, and,
the processor is further configured to, before the transmitter transmits the signaling to the user equipment, determine that the user equipment does not need to execute uplink time synchronization.

6. The network side device according to claim 5, wherein the processor is further configured to determine a base sequence number of the random access preamble signal, wherein the determined base sequence number is consistent with a base sequence number of the sounding reference signal or the physical uplink shared channel demodulation reference signal; and
the transmitter is further configured to transmit the base sequence number determined by the processor to the user equipment.

7. The network side device according to claim 5, wherein the processor is further configured to determine a symbol configured to carry a physical random access channel (PRACH) resource band or resource band pair of the random access preamble signal in a subframe, and for a frequency division duplexing system, the symbol is a last one SC-FDMA symbol or OFDM symbol in an uplink subframe, or, for a time division duplexing system, the symbol is a last one or last two SC-FDMA symbols or OFDM symbols in an uplink subframe or a special subframe.

8. The network side device according to claim 5, wherein the random access response transmitted by the transmitter does not comprise timing alignment information.

9. A user equipment, comprising:
a processor, configured to generate a random access preamble signal, wherein a duration of the random access preamble signal is one single carrier frequency division multiple access (SC-FDMA) symbol or one orthogonal frequency division multiplexing (OFDM) symbol, wherein a sequence group number of the random access preamble signal is consistent with a sequence group number of a sounding reference signal or a physical uplink shared channel demodulation reference signal;
a transmitter, configured to transmit the random access preamble signal generated by the processor to a network side device; and
a receiver, configured to, after the transmitter transmits the random access preamble signal, receive a random access response transmitted by the network side device;
the receiver is further configured to receive a signaling transmitted by the network side device, wherein the signaling indicates that the duration of the random access preamble signal currently used by the user equipment is one SC-FDMA symbol or one OFDM symbol; and
the processor is further configured to generate the random access preamble signal according to the signaling received by the receiver;
wherein the user equipment is located in a small cell;
and, the signaling received by the receiver is transmitted after the network side device determines that the user equipment does not need to execute uplink time synchronization.

10. The user equipment according to claim 9, wherein the receiver is further configured to, before the transmitter transmits the random access preamble signal to the network side device, receive information about a physical random access channel (PRACH) resource band or resource band pair used to carry the random access preamble signal of the user equipment, wherein the information is transmitted by the network side device and the information comprises: a transmission period of the PRACH resource band or resource band pair, a transmission offset of the PRACH resource band or resource band pair in each transmission period, and a frequency domain position of the PRACH resource band or resource band pair;

the processor is configured to, before the transmitter transmits the random access preamble signal to a network side device, determine, according to the information about the PRACH resource band or resource band pair, a PRACH configured to carry the random access preamble signal of the user equipment; and the transmitter is configured to transmit the random access preamble signal generated by the processor to the network side device on the PRACH determined by the processor.

11. The user equipment according to claim 9, wherein the receiver is further configured to, before the transmitter transmits the random access preamble signal to a network side device, receive a base sequence number of the random access preamble signal that are transmitted by the network side device; wherein the base sequence number is consistent with a base sequence number of the sounding reference signal or the physical uplink shared channel demodulation reference signal; and the processor is configured to generate, according to the base sequence number received by the receiver, the random access preamble signal.

12. The user equipment according to claim 9, wherein the processor is configured to determine a symbol configured to carry a physical random access channel (PRACH) resource band or resource band pair of the random access preamble signal in a subframe, and for a frequency division duplexing system, the symbol is a last one SC-FDMA symbol or OFDM symbol in an uplink subframe; or, for a time division duplexing system, the symbol is a last one or last two SC-FDMA symbols or OFDM symbols in an uplink subframe or a special subframe; and the transmitter is configured to transmit the random access preamble signal generated by the processor to the network side device on the SC-FDMA symbol or the OFDM symbol determined by the processor in the subframe.

13. The user equipment according to claim 9, wherein the processor is configured to, before the transmitter transmits the random access preamble signal to the network side device, determine that the random access preamble signal adopts a mapping manner with one subcarrier interval in a frequency domain;

the receiver is further configured to receive a transmission comb of the random access preamble signal transmitted by the network side device; and the transmitter is configured to transmit the random access preamble signal on a subcarrier indicated by the transmission comb received by the receiver.

14. The user equipment according to claim 9, wherein the random access response received by the receiver does not comprise timing alignment information; and the transmitter is further configured to, after the receiver receives a random access response transmitted by the network side device, perform uplink data transmission, and during the transmission, according to the random access response, not adjust a transmission time of the uplink data.

\* \* \* \* \*